United States Patent
Seddiq et al.

(10) Patent No.: US 10,701,609 B2
(45) Date of Patent: *Jun. 30, 2020

(54) METHOD AND SYSTEM FOR PROVIDING AN INTERRUPT-DRIVEN TECHNIQUE FOR MONITORING ONE OR MORE PROPERTIES OF AN ASSET USING A PLURALITY OF MOBILE SENSOR NODES IN A WIRELESS SENSOR NETWORK

(71) Applicant: The King Abdulaziz City for Science and Technology, Riyadh (SA)

(72) Inventors: Yasser Mohammad Seddiq, Riyadh (SA); Mohammed Sulaiman BenSaleh, Riyadh (SA); Syed Manzoor Qasim, Riyadh (SA); Abdulfattah M Obeid, Riyadh (SA); Ahmad Yahya Al-nasheri, Riyadh (SA); Ahmad Masha Alotaibi, Riyadh (SA); Abdulaziz S Almazyad, Riyadh (SA)

(73) Assignee: THE KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 127 days.

This patent is subject to a terminal disclaimer.

(21) Appl. No.: 14/935,489

(22) Filed: Nov. 9, 2015

(65) Prior Publication Data

US 2017/0135017 A1 May 11, 2017

(51) Int. Cl.
*H04W 36/30* (2009.01)
*H04W 4/02* (2018.01)
(Continued)

(52) U.S. Cl.
CPC ............ *H04W 36/30* (2013.01); *H04L 43/08* (2013.01); *H04W 4/025* (2013.01); *H04W 4/70* (2018.02);
(Continued)

(58) Field of Classification Search
None
See application file for complete search history.

(56) References Cited

U.S. PATENT DOCUMENTS

2006/0215588 A1* 9/2006 Yoon ..................... H04W 40/10
370/310
2013/0094430 A1* 4/2013 Mills ..................... H04W 24/06
370/315

(Continued)

FOREIGN PATENT DOCUMENTS

JP 2014-160019 * 9/2014 ............. G01M 3/24

*Primary Examiner* — Christine T Duong
(74) *Attorney, Agent, or Firm* — Steven M. Shape; Dennemeyer & Associates, LLC (57) ABSTRACT

The invention provides a method and system for monitoring one or more properties of an asset using a plurality of mobile sensor nodes. The method includes enabling a first mobile sensor node of the plurality of mobile sensor nodes to perform a data collection operation pertaining to the one or more properties of the asset. The energy status of the first mobile sensor node performing the data collection operation is then monitored. Thereafter, the first mobile sensor node performs a handover of the data collection operation to a second mobile sensor node based on the energy status of the first mobile sensor node. Finally, the data pertaining to the one or more properties of the asset is collected from the plurality of mobile sensor nodes.

14 Claims, 4 Drawing Sheets

(51) Int. Cl.
*H04L 12/26* (2006.01)
*H04W 4/70* (2018.01)
H04W 40/10 (2009.01)
H04W 36/16 (2009.01)
H04W 84/18 (2009.01)

(52) U.S. Cl.
CPC .......... *H04W 36/165* (2013.01); *H04W 40/10* (2013.01); *H04W 84/18* (2013.01); *Y02D 70/142* (2018.01); *Y02D 70/166* (2018.01); *Y02D 70/326* (2018.01)

(56) References Cited

U.S. PATENT DOCUMENTS

| | | | |
|---|---|---|---|
| 2014/0028539 A1* | 1/2014 | Newham | G06F 1/1694 345/156 |
| 2015/0179044 A1* | 6/2015 | Wu | G08B 21/20 370/311 |
| 2016/0349140 A1* | 12/2016 | Teymouri | G01M 3/2807 |

* cited by examiner

METHOD AND SYSTEM FOR PROVIDING AN INTERRUPT-DRIVEN TECHNIQUE FOR MONITORING ONE OR MORE PROPERTIES OF AN ASSET USING A PLURALITY OF MOBILE SENSOR NODES IN A WIRELESS SENSOR NETWORK

FIELD OF THE INVENTION

The invention generally relates to the field of monitoring one or more properties of an asset and performing a data collection operation pertaining to the one or more properties of the asset using a plurality of mobile sensor nodes in a wireless sensor network. More specifically, the invention relates to a method and system for optimizing management of the data collection operation of the plurality of mobile sensor nodes performing the data collection operation.

BACKGROUND OF THE INVENTION

Water pipelines are generally subjected to anomalies such as leakage, bursts and corrosion that can have severe consequences for the environment and the economy. Therefore, in order to ensure the reliability of water pipelines, they must be monitored effectively. Wireless Sensor Networks (WSNs) have emerged as an effective technology for monitoring critical infrastructure such as water, oil and gas pipelines. These WSNs typically employ different type of sensors, such as temperature sensor, pressure sensor, acoustic sensor, flow sensor, and pH sensor for water pipeline monitoring. These sensors generate appropriate electrical signals based on the sensed phenomena. Generally, monitored parameters include temperature, humidity, flow and pressure. Therefore, selecting an appropriate sensor or sensing technique depends on many aspects such as the pipeline material and environment.

In the prior art, the WSNs generally employ a single mobile WSN node that performs the entire monitoring operation of a pipeline. A typical WSN node consists of a sensing subsystem, a processing subsystem, a communication subsystem and a power supply subsystem. The processing subsystem mainly includes a microcontroller and memory processes for storing the sensor data. The WSN node is allowed to move with the water current from the pipeline source down to the pipeline sink where the node is collected and its memory content is copied to a computer. The RF transceiver of the WSN node, which is an important part of communication subsystem receives commands from a central computer and transmits data collected by the static components of the WSN node to the central computer. Moreover, the power for the mobile WSN node is derived from a battery or an energy harvesting (scavenging) device.

Within the pipeline, the mobile WSN node locates measures and logs many events pertaining to the monitoring operation during its long trip within the pipeline. Consequently, the mobile WSN node must be equipped with a large memory size for accommodating the collected information and a long battery life to keep the mobile WSN node alive during its trip through the pipeline.

Moreover, the mobile WSN node must be highly reliable guaranteeing completion of the monitoring operation throughout the entire pipeline distance. In order to achieve this, the mobile WSN node is deployed with a huge physical size at a high cost. The huge size of the mobile WSN node causes the node to get trapped inside the pipeline, thus, blocking the fluid current.

Therefore, in light of the above, there is a need for an improved method and system for monitoring a long-distance pipeline using a plurality of mobile sensor nodes in WSNs.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to monitoring of one or more properties of an asset such as a long-distance pipeline using a plurality of mobile sensor nodes.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for monitoring one or more properties of an asset such as a long-distance pipeline using a plurality of mobile sensor nodes. The method includes enabling a first mobile sensor node of the plurality of mobile sensor nodes to perform a data collection operation pertaining to the one or more properties of the asset, wherein a mobile sensor node performing the data collection operation is in an active mode and remaining mobile sensor nodes of the plurality of mobile sensor nodes are in an inactive mode. The energy status of the first mobile sensor node performing the data collection operation is then monitored. Thereafter, the first mobile sensor node performs a handover of the data collection operation to a second mobile sensor node based on the energy status of the first mobile sensor node. Finally, the data pertaining to the one or more properties of the asset is collected from the plurality of mobile sensor nodes.

Figure 1:
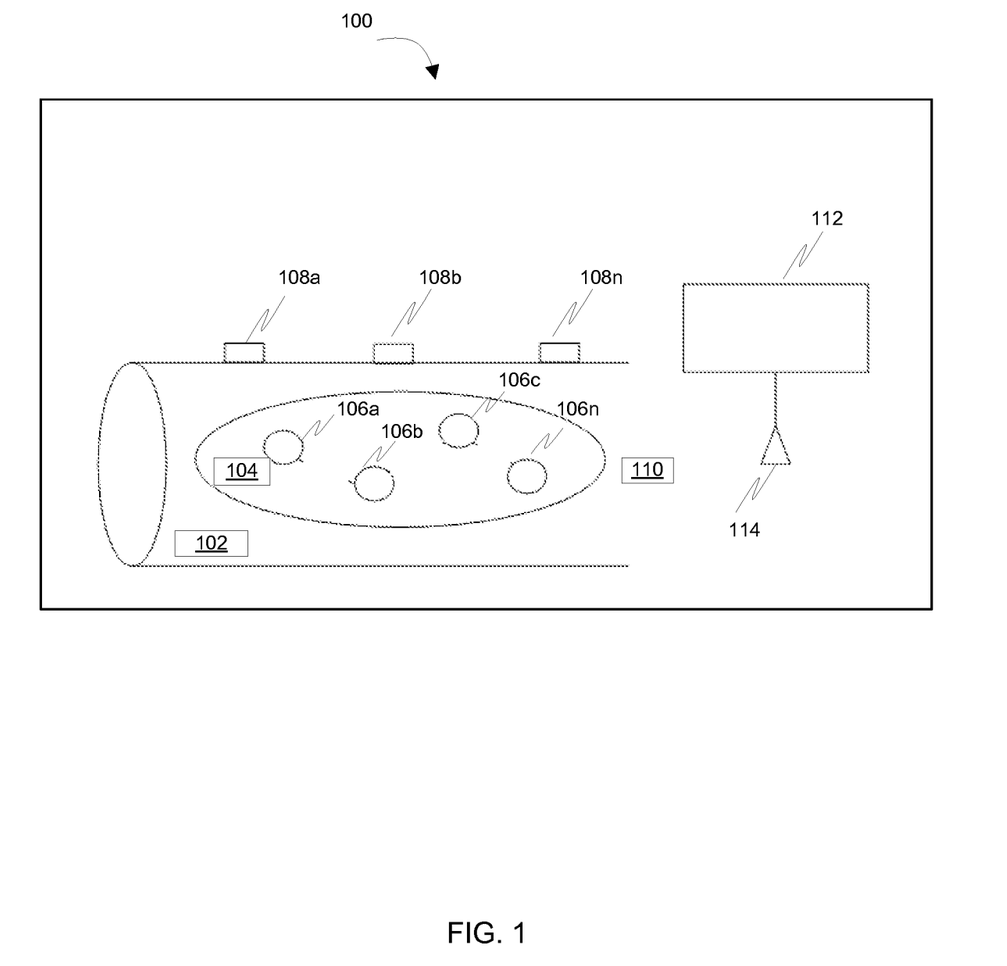
FIG. 1 illustrates a system for monitoring one or more properties of an asset such as a long-distance pipeline in accordance with an embodiment of the invention.

FIG. 1 illustrates a system 100 for monitoring one or more properties of an asset such as a long-distance pipeline 102 in accordance with an embodiment of the invention. The one or more properties of pipeline 102 can be, but not limited to, a leakage of pipeline 102, a burst of pipeline 102 and a corrosion of pipeline 102.

As illustrated, system 100 includes a plurality of mobile sensor nodes 106a-106n that flow freely within fluid 104 inside pipeline 102. Plurality of mobile sensor nodes 106a-106n can be configured to sense one or more of, but not limited to, a fluid flow, a fluid pressure and a fluid temperature. Accordingly, plurality of mobile sensor nodes 106a-106n can be one or more of, but not limited to, a temperature sensor node, a pressure sensor node, an acoustic sensor nodes, a flow sensor node and a pH sensor node.

Plurality of mobile sensor nodes 106a-106n are allowed to move with the current of fluid 104 and while doing so, perform a data collection operation pertaining to the one or more properties of pipeline 102. A mobile sensor node performing the data collection operation is said to be in an "active mode" while a mobile sensor node that has not initiated the data collection operation is said to be in an "inactive mode" or "sleeping mode. An "active mode" refers to a state when a mobile sensor node is powered-on whereas an "inactive mode" refers to a state when a mobile sensor node is in a completely powered-down state. Generally, only a single mobile sensor node is active at a point in time.

Plurality of mobile sensor nodes 106a-106n are communicatively coupled to each other through one of a wireless communication network and a wired communication network. The wireless communication network can be, but not limited to, a Wi-Fi communication network, Wireless Local Area Network (WLAN), Wireless Wide Area Network (WWAN), Wireless Metropolitan Area Network (WMAN), Wide Area Network (WAN) and telecommunication network.

Each mobile sensor node of plurality of mobile sensor nodes 106a-106n performs a data collection operation and then initiates a handover of the data collection operation to another mobile sensor node based on an energy status of the mobile sensor node. The energy status can be associated with one or more of, but not limited to, a battery status indicating the remaining battery capacity of the mobile sensor node and a memory size of the mobile sensor node.

Further, each mobile sensor node of plurality of mobile sensor nodes 106a-106n is equipped with various components for enabling the mobile sensor node to perform the data collection operation and to initiate handover of the data collection operation to another mobile sensor node based on the energy status of the mobile sensor node. The various components are further described in detail in conjunction with FIG. 2.

Additionally, system 100 also includes a plurality of location tracking units 108a-108n deployed across outer surface of pipeline 102. Plurality of location tracking components 108a-108n, can be, but not limited to, radio frequency identifier (RFID) tags. Plurality of location tracking units 108a-108n track the location of each mobile sensor node of plurality of mobile sensor nodes 106a-106n in pipeline 102 and communicate the location information to the mobile sensor node.

After performing handover of the data collection operation, each mobile sensor node shuts down all the components and goes into a "cut-off mode". A "cut-off mode" refers to a state when a mobile sensor node, after completing the data collection operation, is completely powered-off and does not wake up until it reaches pipeline sink 110.

On reaching pipeline sink 110, plurality of mobile sensor nodes 106a-106n dump the collected data in a data collector 112. Plurality of mobile sensor nodes 106a-106n communicate with data collector 112 through a wireless communication network means 114. Wireless communication network means 114, can be, but not limited to, a Wi-Fi antenna for receiving the data collected from plurality of mobile sensor nodes 106a-106n. The data collected by data collector 112, is then, subjected to an offline analysis to identify the one or more properties associated with pipeline 102.

Figure 2:
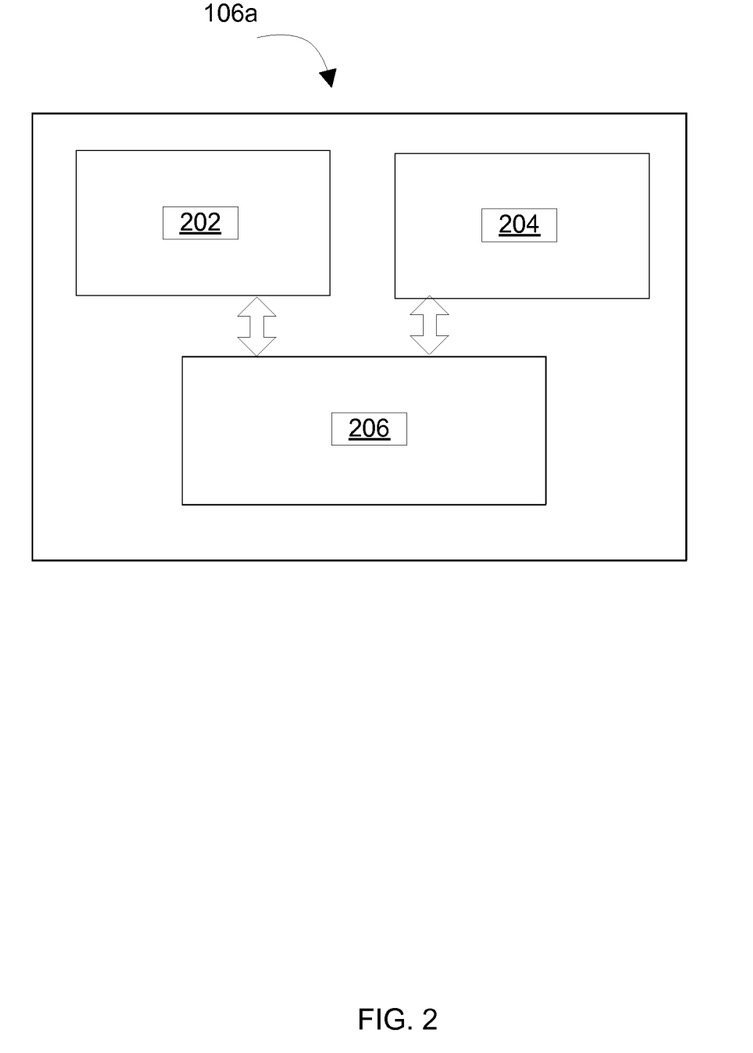
FIG. 2 illustrates various components present within a mobile sensor node for enabling the mobile sensor node to perform the data collection operation pertaining to one or more properties of a long-distance pipeline in accordance with an embodiment of the invention.

FIG. 2 illustrates various components present within mobile sensor node 106a for enabling mobile sensor node 106a to perform the data collection operation pertaining to the one or more properties of pipeline 102 in accordance with an embodiment of the invention.

As illustrated, mobile sensor node 106a includes a memory 202, an energy status monitor 204 and a processor 206.

Energy status monitor 204 is configured to continuously monitor an energy status of mobile sensor node 106a while mobile sensor node 106a is performing the data collection operation. The energy status corresponds to one or more of, but not limited to, a battery status and an available memory size of mobile sensor node 106a.

Processor 206 is communicatively coupled to memory 202 and energy status monitor 204.

In accordance with an embodiment of the invention, mobile sensor node 106a is currently in an active mode while remaining mobile sensor nodes 106b-106n of plurality of mobile sensor nodes 106a-106n are in an inactive mode.

While mobile sensor node 106a is performing the data collection operation in the active mode, energy status monitor 204 that is continuously monitoring the energy status of mobile sensor node 106a communicates the energy status to processor 206. Processor 206, then, performs handover of the data collection operation from mobile sensor node 106a to another mobile sensor node 106b based on the energy status of mobile sensor node 106b as follows.

Processor 206 checks the energy status of mobile sensor node 106a communicated to processor 206 against an energy threshold. The energy threshold can be, but not limited to, a minimum value of energy required for mobile sensor node 106a to perform the data collection operation. The energy threshold may be predefined for each mobile sensor node of plurality of mobile sensor nodes 106a-106n based on one or more of, but not limited to, a battery status and an available memory size for the mobile sensor node.

When the energy status of mobile sensor node 106a is less than the energy threshold, processor 206 allows mobile sensor node 106*a* to handover the data collection operation to mobile sensor node 106*b* by issuing an interrupt to mobile sensor node 106*b*.

Processor 206, then, stores the data collected in memory 202 of mobile sensor node 106*a* with one or more of a time stamp and a location stamp in memory 202 based on the location information received from plurality location tracking units 108*a*-108*n*.

After performing handover of the data collection operation, mobile sensor node 106*a* shuts down all the components and goes into the cut-off mode until it reaches pipeline sink 110. At pipeline sink 110, mobile sensor node 106*a* dumps the data in data collector 112 using wireless communication network means 114.

On the other hand, on receiving the interrupt from mobile sensor node 106*a*, mobile sensor node 106*b* wakes up from the inactive mode and starts performing the data collection operation till the energy status of mobile sensor node 106*b* is less than an energy threshold defined for mobile sensor node 106*b*. When the energy status of mobile sensor node 106*b* is less than the energy threshold defined for mobile sensor node 106*b*, mobile sensor node 106*b* performs handover of the data collection operation to another mobile sensor node 106*c* by issuing an interrupt to mobile sensor node 106*c*. On receiving the interrupt from mobile sensor node 106*b*, mobile sensor node 106*c* wakes up from the inactive mode and starts performing the data collection operation till the energy status of mobile sensor node 106*c* is less than an energy threshold defined for mobile sensor node 106*c*.

Thus, each mobile sensor node of plurality of mobile sensor nodes 106*a*-106*n* awakens only on receiving an interrupt from an active mobile sensor node and performs the data collection operation based on the energy status of the mobile sensor node.

Figure 3:
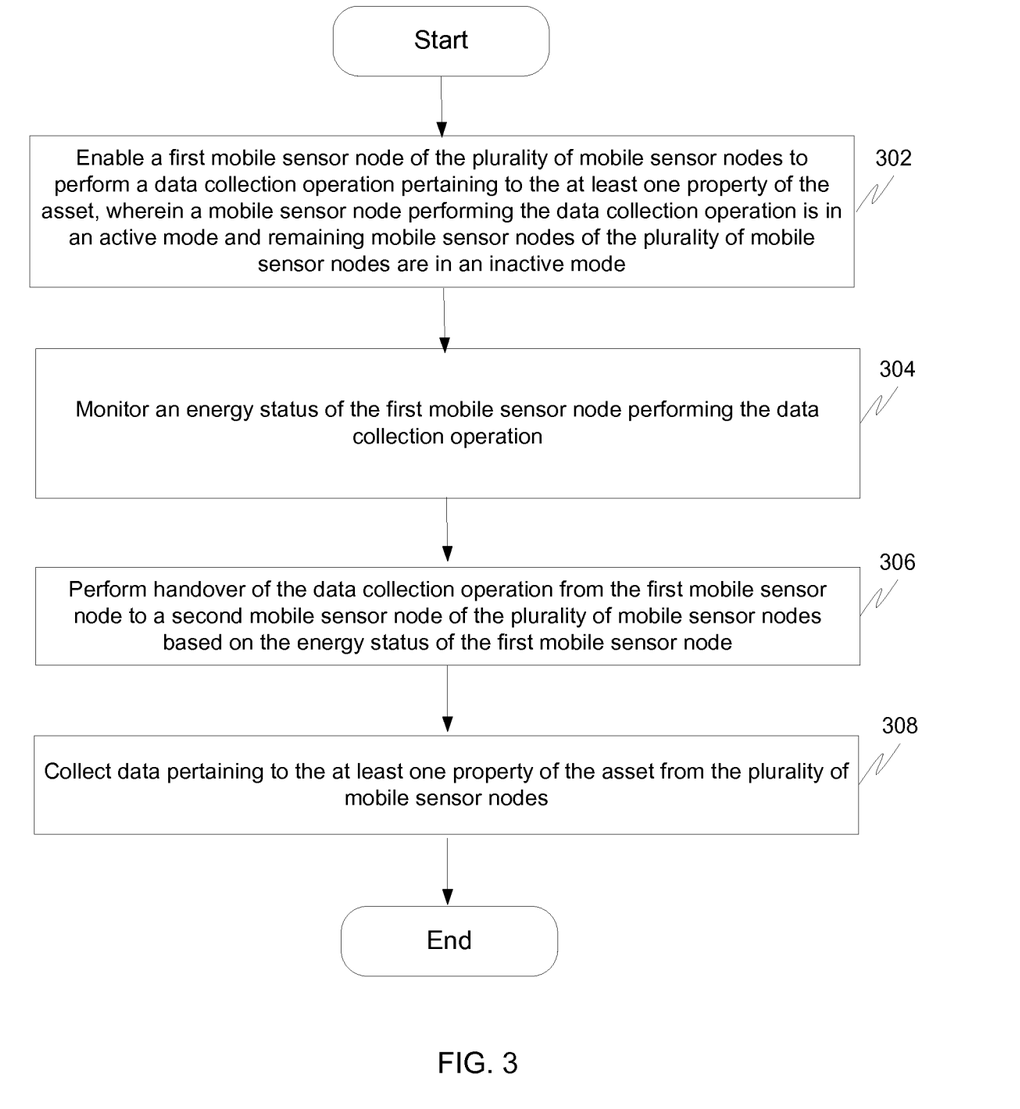
FIG. 3 illustrates a flowchart of a method for monitoring one or more properties of a long-distance pipeline using a plurality of mobile sensor nodes in accordance with an embodiment of the invention.

FIG. 3 illustrates a flowchart of a method for monitoring the one or more properties of pipeline 102 using plurality of mobile sensor nodes 106*a*-106*n* in accordance with an embodiment of the invention.

As step 302, mobile sensor node 106*a* of plurality of mobile sensor nodes 106*a*-106*n* is enabled to perform the data collection operation pertaining to the one or more properties of pipeline 102. Thus, mobile sensor node 106*a* is defined to be in an active mode and remaining mobile sensor node of plurality of mobile sensor nodes 106*a*-106*n* are in an inactive mode.

Moving on, at step 304, an energy status of mobile sensor node 106*a* performing the data collection operation is monitored.

Thereafter, at step 306, mobile sensor node 106*a* performs handover of the data collection operation to another mobile sensor node 106*b* based on the energy status of mobile sensor node 106*a* as follows.

Processor 206 checks the energy status of mobile sensor node 106*a* communicated to processor 206 against an energy threshold.

When the energy status of mobile sensor node 106*a* is less than the energy threshold, processor 206 allows mobile sensor node 106*a* to handover the data collection operation to mobile sensor node 106*b* by issuing an interrupt to mobile sensor node 106*b*.

On the other hand, on receiving the interrupt from mobile sensor node 106*a*, mobile sensor node 106*b* wakes up from the inactive mode and starts performing the data collection operation till the energy status of mobile sensor node 106*b* is less than an energy threshold defined for mobile sensor node 106*b*. When the energy status of mobile sensor node 106*b* is less than the energy threshold defined for mobile sensor node 106*b*, mobile sensor node 106*b* performs handover of the data collection operation to another mobile sensor node 106*c* by issuing an interrupt to mobile sensor node 106*c*. On receiving the interrupt from mobile sensor node 106*b*, mobile sensor node 106*c* wakes up from the inactive mode and starts performing the data collection operation till the energy status of mobile sensor node 106*c* is less than an energy threshold defined for mobile sensor node 106*c*.

Thus, each mobile sensor node of plurality of mobile sensor nodes 106*a*-106*n* awakens only on receiving an interrupt from an active mobile sensor node and performs the data collection operation based on the energy status of the mobile sensor node.

Once the data pertaining to the one or more properties of pipeline 102 is collected by plurality of mobile sensor nodes 106*a*-106*n*, at step 308, the collected data is dumped in data collector 112 when plurality of mobile sensor nodes 106*a*-106*n* reach pipeline sink 110.

The method and system are further described in detail in accordance with an exemplary embodiment of the invention.

Figure 4:
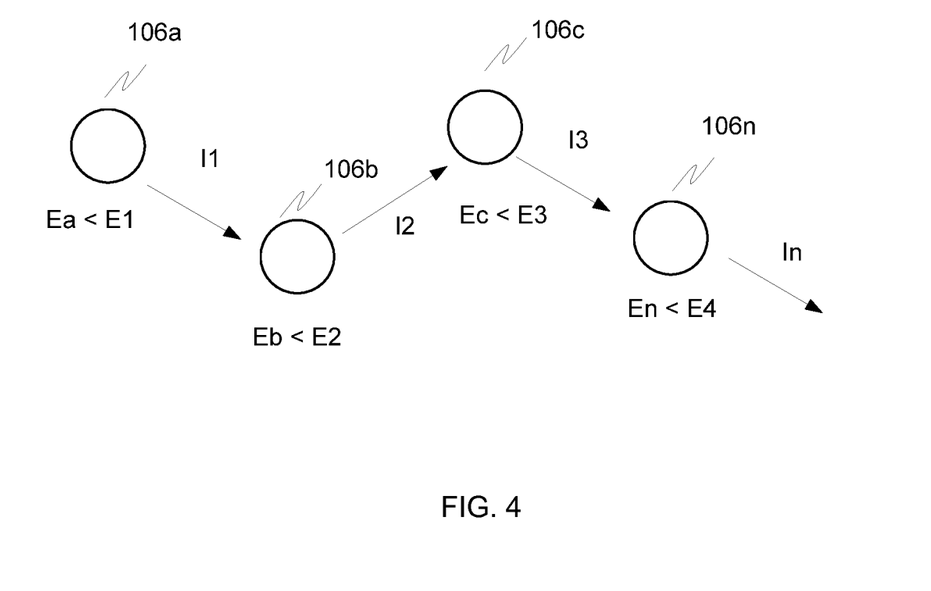
FIG. 4 illustrates performing handover of the data collection operation based on the energy status in plurality of mobile sensor nodes.

FIG. 4 illustrates performing handover of the data collection operation based on the energy status of plurality of mobile sensor nodes 106*a*-106*n*.

As illustrated in FIG. 4, each mobile sensor node of plurality of mobile sensor nodes 106*a*-106*n* is defined with an energy status and a pre-defined energy threshold. For example, mobile sensor node 106*a* has an energy status Ea and a pre-defined energy threshold E1, mobile sensor node 106*b* has an energy status Eb and a pre-defined energy threshold E2, mobile sensor node 106*c* has an energy status Ec and a pre-defined energy threshold E3, mobile sensor node 106*n* has an energy status En and a pre-defined energy threshold E4 and so on. The energy threshold for a mobile sensor node is determined based on a battery status and an available memory size of the mobile sensor node.

Consider that mobile sensor node 106*a* is already in an active mode performing the data collection operation while remaining mobile sensor nodes 106*b*-106*n* of plurality of mobile sensor nodes 106*a*-106*n* are in an inactive mode.

In the active mode, mobile sensor node 106*a*, continuously measures and logs readings pertaining to the one or more properties of pipeline 102. When energy status Ea of mobile sensor node 106*a* becomes less than predefined energy threshold E1 of mobile sensor node 106*a*, mobile sensor node 106*a* stops performing the data collection operation. Mobile sensor node 106*a*, then, issues an interrupt I1 to mobile sensor node 106*b* which was awaiting a trigger to start performing the data collection operation. Thereafter, mobile sensor node 106*a* shuts down all the components and goes into a cut-off mode.

Meanwhile, on receiving interrupt I1 from mobile sensor node 106*a*, mobile sensor node 106*b* wakes up and starts performing the data collection operation. Mobile sensor node 106*b* performs the data collection operation until energy status Eb of mobile sensor node 106*b* is less than predefined energy threshold E2 of mobile sensor node 106*b*. Mobile sensor node 106*b*, then, issues an interrupt I2 to mobile sensor node 106*c*. Mobile sensor node 106*b*, then, goes into the cut-off mode while mobile sensor node 106*c* wakes up and starts performing the data collection operation.

Once each mobile sensor node of plurality of mobile sensor nodes 106*a*-106*n* has completed the data collection operation, the mobile sensor node completely shuts down all components going into the cut-off mode and will never wake up again until plurality of mobile sensor nodes 106a-106n reach pipeline sink 110.

Finally, at pipeline sink 110, data collector 112 collects the data pertaining to the one or more properties of pipeline 102 from plurality of mobile sensor nodes 106a-106n using wireless communication means 114.

Various advantages provided by the invention are outlined below.

The invention helps in reducing a memory size of each mobile sensor node as each mobile sensor node is configured to perform the data collection operation only for a certain distance or time within the pipeline based on the energy status of the mobile sensor node and not for the entire length of the pipeline. Hence, each mobile sensor node can have a smaller battery and memory size that significantly reduces the overall physical size of the mobile sensor node, thus, reducing the risk of the mobile sensor node getting trapped inside the pipeline.

Also, the invention reduces risk due to faulty mobile sensor nodes as the invention deploys multiple mobile sensor nodes for the monitoring and data collection operations. Thus, a faulty mobile sensor node performs handover of the data collection operation by triggering or issuing an interrupt to another mobile sensor node within the pipeline. On receiving the interrupt, the other mobile sensor node starts performing the data collection operation for the pipeline based on the energy status. Thus, the triggered active nodes perform the data collection for the rest of the pipeline. Therefore, the invention enhances coverage for monitoring as well as system reliability.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for monitoring at least one property of an asset using a plurality of mobile sensor nodes, the method comprising:
    enabling a first mobile sensor node of the plurality of mobile sensor nodes to perform a data collection operation pertaining to the at least one property of the asset as the plurality of mobile sensor nodes move along a length of the asset, wherein the first mobile sensor node performing the data collection operation is in an active mode and remaining mobile sensor nodes of the plurality of mobile sensor nodes are in an inactive mode;
    monitoring an energy status of the first mobile sensor node performing the data collection operation;
    performing a handover of the data collection operation from the first mobile sensor node to a second mobile sensor node of the remaining mobile sensor nodes based on the energy status of the first mobile sensor node;
    enabling, after performing the handover, the second mobile sensor node to perform the data collection operation as the plurality of mobile sensor nodes move along the length of the asset; and
    collecting data pertaining to the at least one property of the asset from the plurality of mobile sensor nodes.

2. The method according to claim 1, wherein the asset is a long-distance pipeline.

3. The method according to claim 2, wherein the at least one property comprises at least one of a leakage of the pipeline, a burst of the pipeline and a corrosion of the pipeline.

4. The method according to claim 1, wherein the first mobile sensor node is configured to sense at least one of a flow, a pressure and a fluid temperature.

5. The method according to claim 1, wherein the second mobile sensor node in the inactive mode is in a completely powered down mode awaiting an interrupt from the first mobile sensor node in the active mode to begin the data collection operation.

6. The method according to claim 1, wherein performing handover of the data collection operation comprises enabling the first mobile sensor node to issue an interrupt to the second mobile sensor node when the energy status of the first mobile sensor node is less than an energy threshold, wherein in response to receiving the interrupt the second mobile sensor node assumes an active mode.

7. The method according to claim 1, wherein an energy status of the first mobile sensor node corresponds to at least one of a battery status and an available memory size of the first mobile sensor node.

8. A system for monitoring at least one property of an asset, the system comprising:
    a plurality of mobile sensor nodes, wherein a first mobile sensor node comprises:
        a memory;
        an energy status monitor configured to monitor an energy status of the first mobile sensor node; and
        a processor communicatively coupled with the energy status monitor and the memory, wherein the processor is configured to perform a handover of a data collection operation from the first mobile sensor node to a second mobile sensor node of the plurality of mobile sensor nodes based on the energy status of the first mobile sensor node such that, after the handover is performed, the second mobile sensor node is enabled to perform the data collection operation; and
    a data collector configured to collect data pertaining to the at least one property of the asset from the plurality of mobile sensor nodes as the plurality of mobile sensor nodes move along a length of the asset.

9. The system according to claim 8, wherein the processor is configured to issue an interrupt to the second mobile sensor node when the energy status of the first mobile sensor node is less than an energy threshold.

10. The system according to claim 8, wherein the processor is configured to store data pertaining to the at least one property of the asset with at least one of a time stamp and a location stamp in the memory of the first mobile sensor node.

11. The system according to claim 8, wherein the plurality of mobile sensor nodes is communicatively coupled to each other through one or a wireless communication network and a wired communication network.

12. The system according to claim 8, further comprising a plurality of location tracking units, wherein the plurality of location tacking units are deployed across the asset.

13. The system according to claim 12, wherein the plurality of location tracking units track location of each mobile sensor node of the plurality of mobile sensor nodes with respect to the asset.

14. The system according to claim 13, wherein the plurality of location tracking units communicate location information of the first mobile sensor node to the processor of the first mobile sensor node through a wireless communication network.

\* \* \* \* \*